Feb. 28, 1967    E. H. OLSON ETAL    3,306,971
INSULATED ELECTRICAL STRIP CONDUCTOR AND
METHOD OF MAKING SAME
Filed Dec. 6, 1963
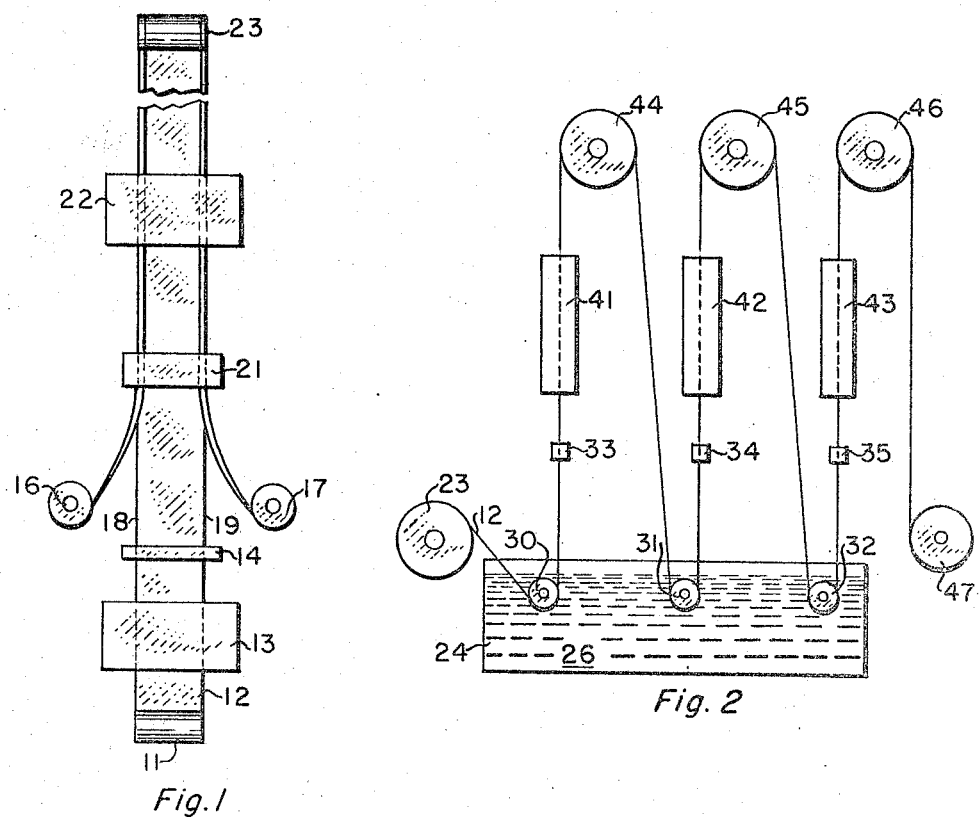
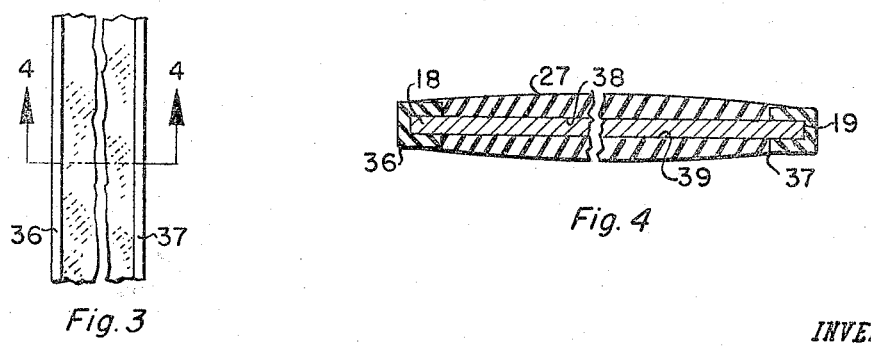
INVENTORS
EMIL H. OLSON
IVAN W. WADE Jr.
MAURICE V. THIERRY
BY U. F. Vock
THEIR AGENT 3,306,971
INSULATED ELECTRICAL STRIP CONDUCTOR AND METHOD OF MAKING SAME
Emil H. Olson, North Muskegon, and Ivan W. Wade, Jr., and Maurice V. Thierry, Muskegon, Mich., assignors to Anaconda Wire and Cable Company, a corporation of Delaware
Filed Dec. 6, 1963, Ser. No. 328,676
12 Claims. (Cl. 174—119)

Our invention relates to a method for insulating a strip conductor and to a conductor so insulated and particularly to such a method and conductor with a ribbon of insulation folded over the edges of the strip.

Electrical conductor strip, which may be referred to as magnet strip conductor, has wide application in the electrical industry in the manufacture of coils which take the place of magnet wire coils in generating magnetic fields. Strip coils have the advantage over wire coils that in any given layer of a strip coil only the upper and lower surfaces require insulation (if we neglect, for the moment, the edges of the strip) whereas, in each layer of a wire coil, insulation is required between the adjacent wires in the same layer. In the manufacture of insulated electrical conductor strip where the strip is coated with enamel insulation such as by a dip process, no entirely satisfactory method has been known to produce adequately insulated strip due to the tendency of the enamel to drain away from the edges and corners of the strip and leave these portions without sufficient insulation. Dielectric weak spots and poor continuity of insulation have occurred with commercially unacceptable frequency at the corners and edges of insulated strip manufactured by known methods.

Strip conductors usually consist of aluminum or copper strips from 1 to 100 mils in thickness and from ¼ inch to over 90 inches in width coated with magnet wire enamel from 1 to 10 mils thick. Our invention is not limited to these metals or to these dimensions, however.

We have discovered that excellent strip conductors can be manufactured with high dielectric strength at the edges of the strip by folding ribbons of insulating film over the edges in such a manner that they bond to the conductor, and then coating the conductor with an insulating enamel compatible with the film. The enamel should bond to the film and remain bonded at the operating temperatures of the strip. Both the film and the enamel must, of course, have thermal stability at operating temperatures and have the required chemical and abrasion resistance and physical properties. Our film ribbon may be polyethylene terephthalate or other polyester, epoxy, polytetrafluoroethylene, pyromellitic dianhydride, or other insulating material. Our invention also contemplates the use of ribbons of paper over the edges of the strip. When polyester film is used, an enamel that we have found to be particularly compatible has a resin component, comprising a polyester with an acid moiety selected from the group consisting of isophthalic acid and terephthalic acid and mixtures thereof and an alcohol moiety selected from the group consisting of glycol and glycerol and mixtures thereof. When a suitable material is selected for the ribbon, it may be bonded to the strip by the application of heat. This is true of a film of pyromellitic polyanhydride such as polytetrafluoroethylene-backed pyromellitic dianhydride sold under the trademark, H-film, by the E. I. du Pont de Nemours Company, and this material is eminently suited for use in the practice of our invention.

We have invented a strip conductor comprising a metallic strip with ribbons of insulating film such as, but not limited to, polyester, polyfluoro hydrocarbons, cellulosics, epoxides, pyromellitic dianhydride, and other film-forming insulating materials bonded to the edges and folded over the flat surfaces which are then covered with insulating enamel. The enamel may cover the whole, or portions of the film, as well as the bare metal surfaces. When the edges are covered with a polyester ribbon we prefer to use an enamel comprised of a polyester with an acid moiety selected from the group consisting of isophthalic acid and terephthalic acid and mixtures thereof and an alcohol moiety selected from the group consisting of glycol and glycerol and mixtures thereof. It is within the scope of our invention that the enamel resins may be combined with suitable modifiers known to the enamelling arts. We have discovered that the ribbon can be bonded to the strip by applying a suitable solvent. Thus if a solvent for the material of the ribbon is applied to the strip, or merely to the edge portions of the strip and the ribbon is pressed onto the strip before the solvent has evaporated a permanent bond between the strip and the ribbon can be initiated. When the ribbon is comprised of polyethylene terephthalate film we have found a suitable solvent to be a blend of phenol and p-chlorophenol in approximately equal proportions.

A more thorough understanding of our invention may be gained from the appended drawing.

In the drawing:

FIGURE 1 is a front elevation, shown schematically, of an apparatus for applying films in accordance with the process of our invention.

FIGURE 2 is a side elevation, shown schematically, of an apparatus for coating the strip in the process of our invention.

FIGURE 3 is a view of the surface of a strip conductor made in accordance with our invention.

FIGURE 4 is a section of the conductor of FIGURE 3.

Referring to FIGURE 1 a coil 11 of strip conductor 12 is paid upwardly through a tank 13 of solvent or adhesive. Although we have shown apparatus for vertical application, it will be understood that we do not wish to be limited to this method. Horizontal application comes equally within the scope of our invention and persons skilled in these arts will understand how to apply our teachings horizontally from the disclosures herein. Excess solvent or adhesive is wiped off by a wiper 14 where necessary, and the strip 12 continues to advance vertically between spools 16, 17 of plastic film or paper ribbons which are folded over respective edges 18, 19 of the strip 12 by passage through a folding die 21. The strip continues through an oven 22 which evaporates excess solvent and completes the bonding. The strip 12 is then taken up on a roll 23. In a preferred embodiment of our invention the spools 16, 17 contain ribbons of polyethylene terephthalate film, the tank 13 contains a mixture of phenol and p-chlorophenol, and the oven 22 is an infrared oven. The film is partially dissolved by the solvent to form an adhesive surface that bonds well to the conductor 12. Where paper edging ribbons are used an adhesive, of which suitable types are well known, can be applied in the tank 13 instead of solvent. In this case, since the adhesive will not usually be volatile the tank 13 may be designed to apply it only to the edge of the strip or the wiper 14 may remove all adhesive except at the edges. For the application of heat sealable film such as polytetrafluoroethylene-backed pyromellitic dianhydride, the tank 13 and wiper 14 may be eliminated along with the oven 22 and the die 21 may be heated to fuse the film to the conductor.

The roll 23 containing the conductor 12 with film-covered edges is then mounted to pay off into the insulating tank 24 (FIGURE 2) containing an enamel compound 26 where the conductor is coated with enamel insulation 27. Although we have indicated a process wherein three coats of enamel are applied, a greater or lesser number may be applied within the scope of our invention. We have shown the conductor 12 passing under submerged idler rolls 30, 31, 32 and through metering dies 33, 34, 35. But it will be understood that other means of coating the surface of the strip 12 with enamel 26, such, for example, as transfer rolls, spraying, or feeding enamel directly into the dies will come within the scope of our invention. The ribbon from the rolls 16, 17 forms folded insulation coverings 36, 37 (FIGURE 4) over the edges 18, 19 of the strip 12. We have discovered, however, that although the film coverings 36, 37 enlarge the edges of the strip as it enters the tank 24 and the enamel is applied over both the bare portions of the strip and the edges, it tends, preferentially, to build up on flat surfaces 38, 39 of the strip and drain from the edges until there is a substantially uniform coating of insulation around the entire strip. In the event that a viscous enamel coating is applied that does not drain from the edges, the dies 33, 34, 35 may be shaped to fit closely at the edges and scrape off any excess enamel. The dies 33, 34, 35 may be roller dies and may have separate roller components for the edges. We have found, however, that standard dies intended for strip without films folded over the edges, can be used satisfactorily in the practice of our invention, and will not build up excessively thick walls at the edges of the strip. Where the film coverings 36, 37 are polyester, we have found that a suitable enamel 26 may have a resin component comprising a polyester with an acid moiety of isophthalic or terephthalic acid or mixtures of these two and an alcohol moiety of glycol or glycerol or a mixture thereof.

After leaving the die 33 the strip passes through an oven 41 which serves to evaporate the enamel solvent and cure the enamel. Similar ovens 42, 43 are mounted above the dies 34, 35. Although we have shown simple oven means it will be understood that, since different temperatures may be required to evaporate enamel solvent and bake the enamel, more complex oven means comprising two or more elements may be used within the scope of our invention. Upon leaving the ovens the strip passes over return rolls 44, 45, 46 and is finally taken up in a coil 47. Where enamel systems are used which require no ovens, such systems are understood to come within the scope of our invention.

We have invented a new and useful method and article of manufacture for which we desire an award of Letters Patent.

We claim:

1. The method of insulating an electrical strip conductor comprising the steps of:
    (A) bondingly folding ribbons of insulating film over the edges only of said conductor,
    (B) coating said conductor having film-covered edges with a liquid insulating enamel compatible with said film, and
    (C) baking said enamel.

2. The method of claim 1 wherein said film is polyethylene terephthalate.

3. The method of claim 2 wherein said enamel has a resin component comprising a polyester with an acid moiety selected from the group consisting of isophthalic acid and terephthalic acid and mixtures thereof and an alcohol moiety selected from the group consisting of glycol and glycerol and mixtures thereof.

4. The method of claim 1 wherein said film is pyromellitic dianhydride.

5. The method of insulating an electrical strip conductor comprising the steps of:
    (A) bondingly folding ribbons of insulating paper over the edges only of said conductor,
    (B) coating said conductor having paper-covered edges with a liquid insulating enamel, and
    (C) baking said enamel.

6. The method of insulating an electrical strip conductor comprising the steps of:
    (A) wetting said conductor with a volatile solvent,
    (B) folding ribbons of insulating film over the edges only of said conductor wetted by said solvent,
        (a) said film being at least partially soluble in said solvent whereby said film is bonded to said conductor,
    (C) coating said conductor having film-covered edges with a liquid insulating enamel compatible with said film, and
    (D) baking said enamel.

7. The method of insulating an electrical strip conductor comprising the steps of:
    (A) wetting said conductor with a blend of phenol and p-chlorophenol,
    (B) folding ribbons of polyethylene terephthalate film over the edges only of said conductor wetted by said blend,
    (C) heating said strip, thereby bonding said film to said conductor,
    (D) coating said conductor having said film-covered edges with a liquid insulating enamel compatible with said film, and
    (E) baking said enamel.

8. The method of claim 7 where said enamel has a resin component comprising a polyester with an acid moiety selected from the group consisting of isophthalic acid and terephthalic acid and mixtures thereof and an alcohol moiety selected from the group consisting of glycol and glycerol and mixtures thereof.

9. An insulated electric strip conductor comprising:
    (A) a metallic strip,
    (B) ribbons of insulating film bondingly folded over the edges only of said strip, and
    (C) a baked insulating enamel, compatible with said film, covering said conductor.

10. The conductor of claim 9 wherein said film is polyethylene terephthalate.

11. The conductor of claim 10 wherein said enamel comprises a polyester with an acid moiety selected from the group consisting of isophthalic acid and terephthalic acid and mixtures thereof and an alcohol moiety selected from the group consisting of glycol and glycerol and mixtures thereof.

12. The conductor of claim 9 wherein said film is polytetrafluoroethylene-backed pyromellitic dianhydride.

References Cited by the Examiner

UNITED STATES PATENTS

| | | | |
|---|---|---|---|
| 753,461 | 3/1904 | Anderson | 174—117.11 |
| 2,696,865 | 12/1954 | Seiler | 156—202 X |
| 2,828,236 | 3/1958 | West | 156—330 X |
| 2,892,747 | 6/1959 | Dye | 161—231 X |
| 2,970,937 | 2/1961 | Hammer et al. | 156—52 |
| 3,179,633 | 4/1965 | Endrey | 161—189 X |
| 3,228,818 | 1/1966 | Seby | 156—335 X |

FOREIGN PATENTS 759,876  10/1956  Great Britain.

EARL M. BERGERT, *Primary Examiner.*

H. F. EPSTEIN, *Assistant Examiner.*